United States Patent
DeFazio et al.

(10) Patent No.: US 6,967,853 B2
(45) Date of Patent: Nov. 22, 2005

(54) IN-RUSH CURRENT MANAGEMENT

(75) Inventors: Anthony N. DeFazio, Brandon, FL (US); Charles F. Hayek, Seminole, FL (US); Clifford T. Molaskey, St. Petersburg, FL (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/729,550

(22) Filed: Dec. 5, 2003

(65) Prior Publication Data

US 2005/0122749 A1 Jun. 9, 2005

(51) Int. Cl.[7] .............................................. H02M 1/12
(52) U.S. Cl. ........................ 363/49; 323/901; 323/908
(58) Field of Search ................................ 323/901, 908; 363/49, 50, 55, 56.03, 56.04

(56) References Cited

U.S. PATENT DOCUMENTS

| | | | | |
|---|---|---|---|---|
| 4,333,049 A | * | 6/1982 | Yui et al. ................... | 324/102 |
| 5,202,819 A | * | 4/1993 | Min ........................... | 361/436 |
| 5,682,091 A | * | 10/1997 | Williamson et al. ........ | 318/800 |
| 6,163,712 A | * | 12/2000 | Winkler et al. ............. | 323/908 |
| 6,297,979 B1 | * | 10/2001 | Tse ............................ | 323/908 |
| 6,414,860 B1 | * | 7/2002 | Li .............................. | 363/49 |
| 6,433,507 B1 | | 8/2002 | Makaran et al. | |
| 6,628,113 B2 | * | 9/2003 | Gallavan ................... | 324/102 |

* cited by examiner

*Primary Examiner*—Bao Q. Vu
(74) *Attorney, Agent, or Firm*—Schwegman, Lundberg, Woessner & Kluth, P.A.

(57) ABSTRACT

A duty cycle and period of clock stimulus signals of power conversion device are independently altered to handle in-rush current. In one embodiment, transient power supply turn on current observations coupled with changing of the duty cycle and period of clock stimulus (frequency) are used to select a duty cycle and frequency for the power conversion device. A programmable logic device is programmed with firmware in one embodiment to independently alter the duty cycle of the power conversion device. Optimization of the duty cycle and frequency occurs empirically at a higher level of assembly, allowing adjustments that account for both parasitic and process induced variations and system configuration adjustments. In further embodiments, in-rush current is measured during operation of the power conversion device, and the duty cycle and frequency are adjusted in real time in response to such measured current.

21 Claims, 3 Drawing Sheets

IN-RUSH CURRENT MANAGEMENT

GOVERNMENT FUNDING

The invention described herein was made with U.S. Government support under Grant Number DASG60-00-C-0072 awarded by THAAD. The United States Government has certain rights the invention.

FIELD OF THE INVENTION

The present invention relates to current management, and in particular to management of in-rush current.

BACKGROUND OF THE INVENTION

Variations in current flowing to high voltage power conversion devices can have adverse affects on the power conversion devices. In some instances, if not well controlled, it can result in large in-rush currents. It is possible that devices coupled to the power conversion devices may be damaged if the in-rush current is not adequately controlled. Prior attempts to control the in-rush current involved analysis of transformer inductances and power wiring parasitic inductance. Piece-wise pulse width modulation was then used to limit the in-rush current below a set value. Given differences in power supply wiring, and other factors, it was difficult to select the proper modulation that would work for all devices.

SUMMARY OF THE INVENTION

A duty cycle and period of clock stimulus signals of power conversion device are independently altered to handle in-rush current. In one embodiment, transient power supply turn on current observations coupled with changing of the duty cycle and period of clock stimulus (frequency) are used to select a duty cycle and frequency for the power conversion device.

A programmable logic device is programmed with firmware in one embodiment to independently alter the duty cycle of the power conversion device. Optimization of the duty cycle and frequency occurs empirically at a higher level of assembly, allowing adjustments that account for both parasitic and process induced variations and system configuration adjustments. Such adjustments include time line alterations in power sequencing. By observing the power supply in-rush current and modifying the duty cycle and frequency, the in-rush current is effectively handled without adverse affects to devices coupled to the power conversion device. In a further embodiment, simulation results are used to help in adjusting the duty cycle and frequency during their empirical determination.

In further embodiments, in-rush current is measured during operation of the power conversion device, and the duty cycle and frequency are adjusted in real time in response to such measured current. A table of duty cycle and frequency values may be created and indexed by different currents. Such values may be continuously changed during an in-rush current, or at periodic time periods.

In yet a further embodiment, when a power conversion device is powered up, the in-rush current is measured and used to adjust the duty cycle and frequency during subsequent power-ups.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, field programmable gate array (FPGA) or other type of processor operating on a computer system, such as a personal computer, server or other computer system.

Figure 1:
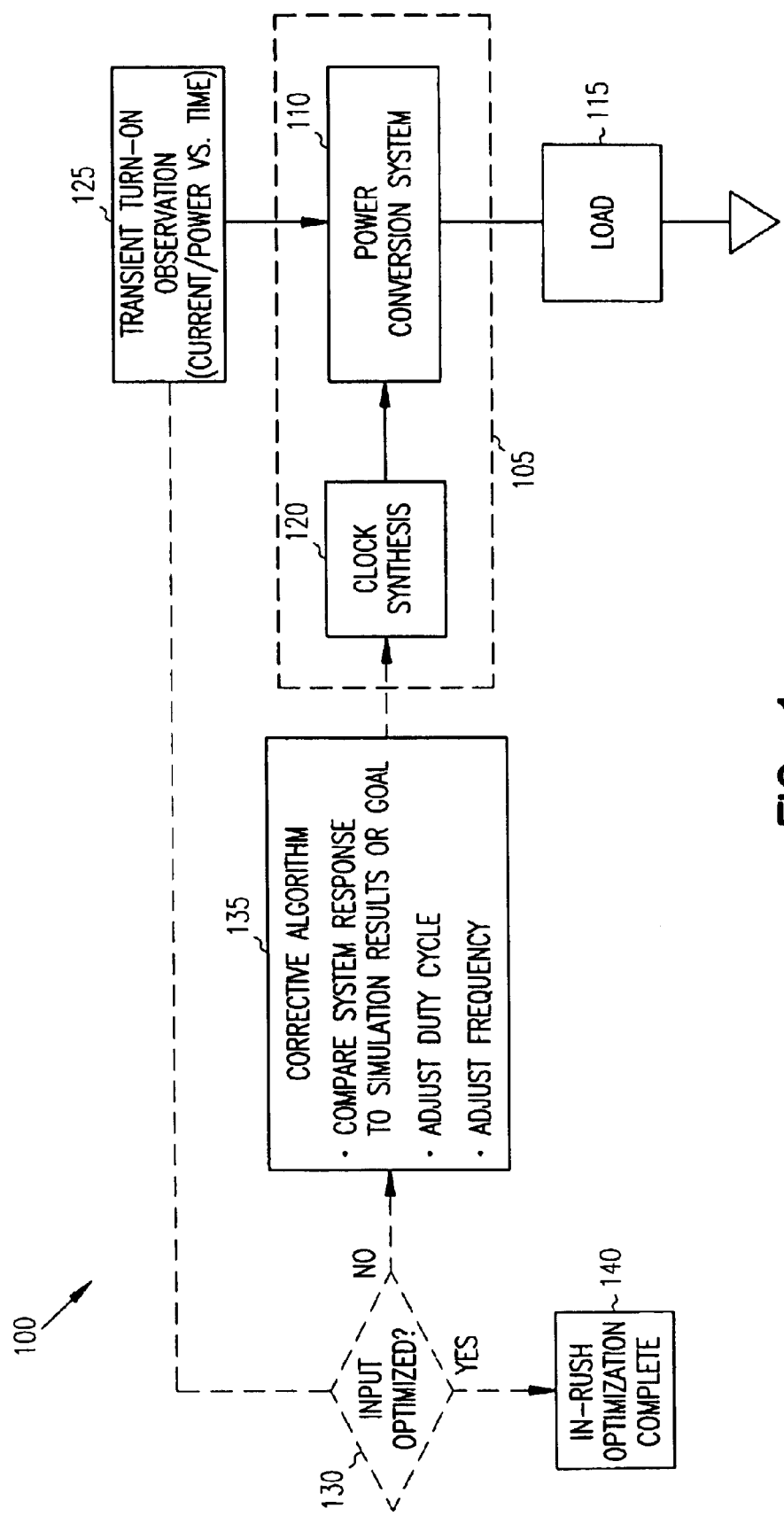
FIG. 1 is a block diagram of a system for determining and setting a duty cycle and frequency of a power conversion device in response to power supply in-rush current according to an embodiment of the invention.

FIG. 1 is a block diagram of a system 100 for determining and setting a duty cycle and frequency of a power conversion device 105 in response to power supply in-rush current according to an embodiment of the invention. The power conversion device 105 comprises a power converter 110 that can be coupled to a load 115.

A clock synthesis function 120 of the power conversion device is coupled to the power converter 110 and provides for manipulation of clock attributes of the power converter 110, including duty cycle and frequency. In one embodiment, this function is provided by a field programmable gate array (FPGA), but could be any re-programmable logic device. The device has non-volatile memory on board, and is also reprogrammable via an external connector in one embodiment. Load 115 may be one or more of load types, including linear and non-linear. In one embodiment, the load comprises a ring laser gyro including gas plasma elements. Such a load requires a high voltage for a short period of time. For some such loads, 2500 to 3000 volts is required for a short period of time. This resulted in large in-rush currents in prior devices. This in-rush current is measured in one embodiment by a circuit 125. In one embodiment, a resistive shunt or inductive current probe with a wide bandwidth oscilloscope is used to measure the in-rush current. Other methods may also be employed to observe the transient turn on characteristics, such as current divided by power versus time.

The turn on characteristics are provided to a decision block 130, which determines whether current settings for the clock attributes are optimized. In other words, it determines if the in-rush current is acceptable. If so, the clock attributes are adequate or optimized to minimize the in-rush current such that it is below a predetermined value.

A corrective algorithm 135 is applied if the in-rush current is not optimized or acceptable as determined at 130. The corrective algorithm in one embodiment compares the actual measured in-rush current characteristics to simulation results or a goal. The duty cycle and/or the frequency is then set at 120.

In one embodiment, the programmable logic device 120 such as a FPGA is loaded with firmware to independently alter the duty cycle and period of clock stimulus signals that feed the power converter 110 electronics. This provides for generation or alteration of a digital steering signal,. thus allowing adjustments necessary to achieve transient current control optimization. This optimization can be performed empirically at a higher level of assembly to take into account parasitic/process induced variations and system configuration adjustments. It can also take into account simulation results.

The following algorithm describes an iterative approach that may be used in one embodiment.

Algorithm:
1. Divide the input transient pulse width into four equal time segments.
2. Pick the same frequency for all time segments with a 50% of period pulse width.

For the first time segment:
3. Decrease the pulse width and generate the transient until the amplitude is less than required.
4. Repeat 3 for the second through fourth time segments.

The optimization allows adjustments that account for both parasitic and process induced variations and system configuration adjustments. System configuration adjustments can include time line alterations in power sequencing. It is accomplished by using re-programmable devices and a discriminant to optimize power supply in-rush current. In one embodiment, the in-rush current correction is applied during power-on. After power-on is complete, as evidenced by a steady state condition, PWM may be controlled within the power conversion system.

Figure 2:
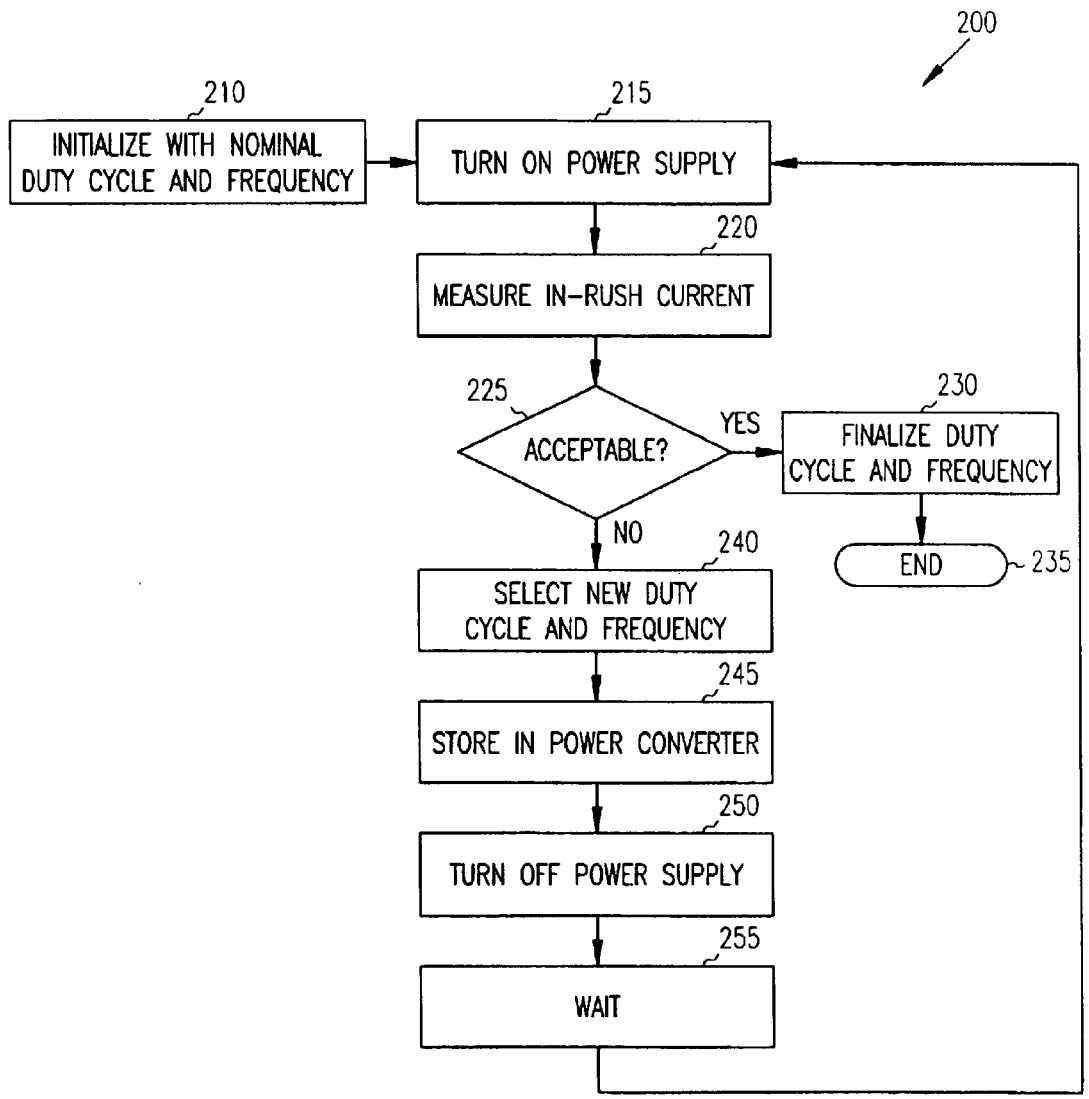
FIG. 2 is a flowchart of the operation of the system of FIG. 1 according to an embodiment of the invention.

FIG. 2 is a flowchart of the operation 200 of the system of FIG. 1 according to an embodiment of the invention. At 210, the system is initialized with a nominal duty cycle and frequency. These parameters may be selected based on expected final values, or simulation results if desired. At 215, the power to the system is turned on, and the in-rush current characteristics are measured at 220. At 225, the measured in-rush current is compared to a desired maximum value, and if acceptable, the duty cycle and frequency are correct at 230 and are stored to finalized, and the process ends at 235.

If the in-rush current is not acceptable, such as by exceeding a predetermined value, or exhibits other undesired characteristics, a new duty cycle and frequency are selected at 240. This selection may be based on an algorithm to obtain a desired convergence of the parameters to achieve acceptable in-rush current characteristics, or may be based on simulation results. The amount of adjustment may also be based on a table of values corresponding to deltas to be applied to each parameter indexed by the amount the in-rush current exceeded a desired value, or any other type of algorithm desired. The actual algorithm will depend on many different conditions, and may be different for each type of power conversion system and for different layouts.

The new frequency and duty cycle for the power conversion system is then stored at 245 and the power supply is turned off at 250. After a wait period 255, that allows for all transients to die off, and optionally for the system to be in a state similar to that for a cold start, the power is again turned on at 215, and the process is iteratively repeated until the in-rush current is acceptable at 225.

Figure 3:
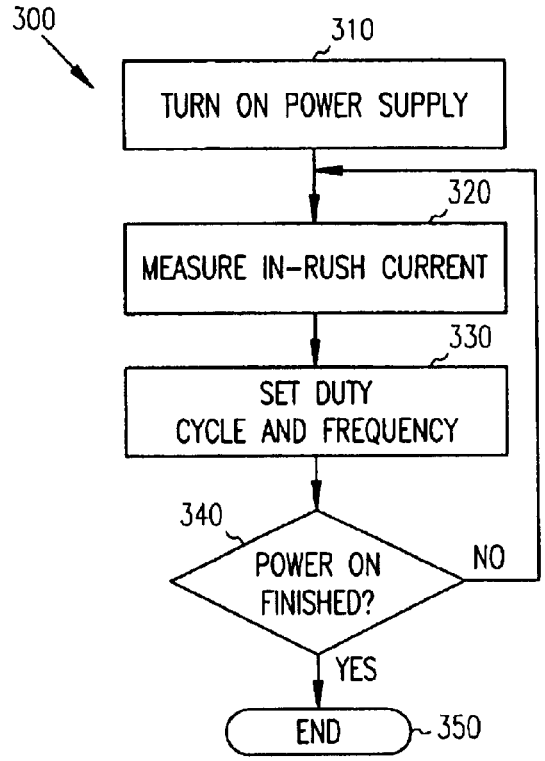
FIG. 3 is a flowchart of operation of a power conversion system according to an embodiment of the invention.

FIG. 3 is a flowchart of operation 300 of a power conversion system according to an alternative embodiment of the invention. In this operation of the power conversion system, the duty cycle and frequency are adjusted during power-on. At 310, the power supply is turned on. The duty cycle and frequency have been set prior to the power-on to prevent the beginning in-rush current from exceeding a desired value. At 320, the in-rush current is measured, and at 330, a new duty cycle and frequency are calculated based on the measured in-rush current. The new duty cycle and frequency parameters are modified if the in-rush current is approaching a predetermined value. This value is set below a maximum desired in-rush current to allow ensure that prior to the parameters being changed, the in-rush current does not exceed the maximum desired value.

At 340, it is determined whether or not the power-on is complete. This may be based on the in-rush current decreasing below a predetermined minimum value, or may be based on time elapsed since power-on. Element 340 may also include a time delay if desired to keep the parameters from being modified too frequently. If the power-on has not completed, the process returns to 340 to measure the in-rush current and modify the duty cycle and frequency at 330. The process is repeated until power-on has completed, and ends at 350. Upon ending, the duty cycle and frequency may be set to desired operational values. This can also occur at 330 when the in-rush current goes below a predetermined value.

Figure 4:
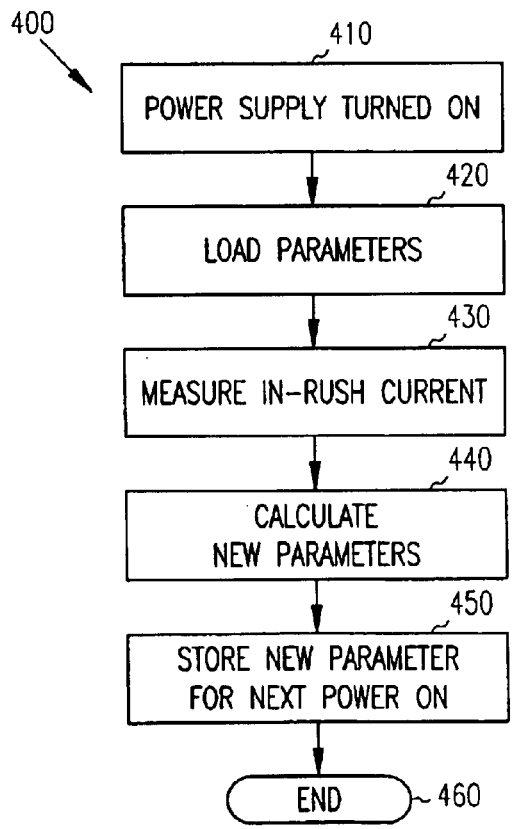
FIG. 4 is a flowchart of operation of an alterative power conversion system according to an embodiment of the invention.

FIG. 4 is a flowchart of operation 400 of an alterative power conversion system according to an embodiment of the invention. In this embodiment, the power is turned on at 410, and the duty cycle and frequency parameters are loaded at 420. The in-rush current is then measured at 430, and new duty cycle and frequency parameters are calculated if the in-rush current is not optimal. These parameters are then stored at 450 for use during the next power-on. The process then ends at 460.

What is claimed is:

1. A method of modifying in-rush current during power-on for a power conversion system having a duty cycle and frequency, the method comprising:
   measuring the in-rush current following power-on;
   determining a new duty cycle and frequency for the power conversion system in response to the measured in-rush current; and
   storing the determined duty cycle and frequency for use by the power conversion system.

2. The method of claim 1 wherein the elements are repeated in an iterative process to obtain optimal duty cycle and frequency.

3. The method of claim 1 wherein the new duty cycle and frequency are determined empirically.

4. The method of claim 1 wherein the new duty cycle and frequency are determined as a function of a simulation of the power conversion system.

5. The method of claim 1 wherein the new duty cycle and frequency are independently determined.

6. The method of claim 1 wherein the wherein the new duty cycle and frequency are determined at a high level of assembly to take into account both parasitic and process induced variations.

7. The method of claim 1 wherein the duty cycle and frequency are continuously modified in real time in response to varying in-rush current measurements.

8. A method of modifying in-rush current during power-on for a power conversion system having a duty cycle and frequency, the method comprising:
   measuring the in-rush current following power-on;
   determining a new duty cycle and frequency for the power conversion system in response to the measured in-rush current;
   setting the duty cycle and frequency for clock pulses for the power conversion system; and
   while power-on is in progress, repeating the measuring, determining and setting elements.

9. The method of claim 8 wherein a new duty cycle and frequency is determined if the measured in-rush current is above a predetermined threshold.

10. The method of claim 9 wherein the predetermined threshold is below a maximum permissible in-rush current.

11. A method of modifying in-rush current during power-on for a power conversion system having a duty cycle and frequency, the method comprising:
    measuring the in-rush current following power-on;
    determining a new duty cycle and frequency for the power conversion system in response to the measured in-rush current;
    setting a new duty cycle and frequency for clock pulses for the power conversion system; and
    using the new duty cycle for the next subsequent power-up.

12. A system that modifies in-rush current during power-on for a power conversion system having a duty cycle and frequency, the system comprising:
    means for measuring the in-rush current following power-on;
    means for determining a new duty cycle and frequency for the power conversion system in response to the measured in-rush current; and
    means for storing the determined duty cycle and frequency for use by the power conversion system.

13. The system of claim 12 wherein the elements are repeated in an iterative process to obtain optimal duty cycle and frequency.

14. The system of claim 12 wherein the new duty cycle and frequency are determined empirically.

15. The system of claim 12 wherein the new duty cycle and frequency are determined as a function of a simulation of the power conversion system.

16. The system of claim 12 wherein the duty cycle and frequency are continuously modified in real time in response to varying in-rush current measurements.

17. A system for controlling in-rush current during power-on, the system comprising:
    a power conversion system;
    a logic device coupled to the power conversion system for providing a duty cycle parameter and a frequency parameter to the power conversion system, wherein the parameters are externally programmable;
    a measurement device that measures in-rush current characteristics during power-on; and
    a correction device that modifies the parameters in response to the measured in-rush current characteristics and programs the parameters into the logic device.

18. The system of claim 17 wherein the new duty cycle and frequency are determined empirically.

19. The system of claim 17 wherein the new duty cycle and frequency are determined as a function of a simulation of the power conversion system.

20. The system of claim 17 wherein the new duty cycle and frequency are independently determined.

21. The system of claim 17 wherein the wherein the new duty cycle and frequency are determined at a high level of assembly to take into account both parasitic and process induced variations.

* * * * *